US006467356B1

(12) United States Patent
Schoch

(10) Patent No.: US 6,467,356 B1
(45) Date of Patent: Oct. 22, 2002

(54) FORCE SEVERITY MONITOR FOR A PRESS

(75) Inventor: Daniel A. Schoch, Minster, OH (US)

(73) Assignee: The Minster Machine Company, Minster, OH (US)

( * ) Notice: Subject to any disclaimer, the term of this patent is extended or adjusted under 35 U.S.C. 154(b) by 0 days.

(21) Appl. No.: 09/679,213

(22) Filed: Oct. 4, 2000

Related U.S. Application Data

(60) Provisional application No. 60/159,818, filed on Oct. 15, 1999.

(51) Int. Cl.[7] .................................................. G01D 1/16

(52) U.S. Cl. ......................................................... 73/791

(58) Field of Search .......................... 73/796, 797, 789, 73/790, 791

(56) References Cited

U.S. PATENT DOCUMENTS

| | | | | |
|---|---|---|---|---|
| 3,888,108 A | * | 6/1975 | Brands | 73/12.13 |
| 4,094,188 A | * | 6/1978 | Bellouin et al. | 73/862.53 |
| 4,314,185 A | * | 2/1982 | Scheider et al. | 318/85 |
| 4,453,421 A | * | 6/1984 | Umano | 73/862.54 |
| 4,461,182 A | * | 7/1984 | Jones, Jr. et al. | 73/862.53 |
| 4,510,570 A | | 4/1985 | Yonekura | |
| 4,570,229 A | * | 2/1986 | Breen et al. | 364/476 |
| 4,633,720 A | | 1/1987 | Dybel et al. | |
| 4,723,429 A | | 2/1988 | Weber et al. | |
| 4,750,131 A | | 6/1988 | Martinez | |
| 4,855,923 A | | 8/1989 | Fullmer | |
| 4,988,979 A | | 1/1991 | Sasaki et al. | |
| 5,094,107 A | | 3/1992 | Schoch | |
| 5,491,647 A | | 2/1996 | O'Brien et al. | |
| 5,564,298 A | | 10/1996 | DeMeo | |
| 5,724,843 A | | 3/1998 | Kirii et al. | |

* cited by examiner

*Primary Examiner*—Max Noori
(74) *Attorney, Agent, or Firm*—Randall J. Knuth

(57) ABSTRACT

An apparatus and method for monitoring the force severity and impulse energy of a mechanical press for the purpose of accurately predicting operating reliability of a press during its production operation. The method includes continuous or intermittent, automatic or manual monitoring the load during production operation of the press. Apparatus is used to monitor the load which is then communicated to a computational device which computes the impulse energy for one slide stroke of the mechanical press.

24 Claims, 3 Drawing Sheets

FORCE SEVERITY MONITOR FOR A PRESS

CROSS-REFERENCE TO RELATED APPLICATIONS

This application relates to and claims the benefit under 35 U.S.C. §119 of Provisional Application Ser. No. 60/159,818 filed Oct. 15, 1999 by the same inventor.

BACKGROUND OF THE INVENTION

1. Field of the Invention

The present invention relates generally to press force severity monitoring and, more particularly to utilizing monitored force severity to determine impulse energy for the purpose of determining the effects of any press/die application on the long-term operating reliability of a press during production operation.

2. Description of the Related Art

Mechanical presses of the type performing stamping and drawing operations employ a conventional construction that includes a frame structure having a crown and a bed portion and which supports a slide in a manner enabling reciprocating movement toward and away from the bed. These press machines are widely used for a variety of workpiece operations employing a large selection of die sets with the press machine varying considerably in size and available tonnage depending upon its intended use.

The press machine applies force to a workpiece so that the stock material acquires the desired formation which corresponds to the die set being utilized. Systems for monitoring press operating reliability assist the press owner in evaluating the severity of certain die/load applications on the reliability of the press being monitored. Conventional monitoring systems include systems which monitor the peak load being developed within certain components of the press machine during a slide stroke of the press. These monitored peak load levels are then compared with historical peak load level measurements or reference peak load levels.

Known load monitoring systems include systems which indicate the loads on presses and automatically detect if the load incurred by the force carrying member exceeds a predetermined value or is below a predetermined value.

Monitoring the maximum loads exerted on load bearing members during a slide stroke of a mechanical press allows press and die applications to be adjusted when monitored peak load values are outside the identified range. However, monitoring peak load is not an accurate operating reliability indicator since peak load does not account for multiple load peaks, peak loads which occur more than once during a press cycle, both compressive and tensile loads, multiple compressive or tensile peaks, or impulse energy.

SUMMARY OF THE INVENTION

The present invention is directed to improve upon the aforementioned method and means of monitoring the operating reliability of a mechanical press, wherein it is desired to monitor the operating reliability of a mechanical press in such a way so as to account for both compressive and tensile loads, multiple peak compressive and tensile loads, and impulse energy.

The present invention provides a method and apparatus for monitoring the long-term operating reliability of a mechanical press during its production operation which measures load over time and utilizes impulse energy as a measure of the operating condition of the mechanical press.

The invention, in one form thereof, comprises a load sensor which senses compressive and tensile loads and is affixed to a load bearing member of a mechanical press, and a computational device for receiving the load value from the load sensor and computing a measure of the impulse energy for one slide stroke of the running press. The computational device can be, for example, a microprocessor.

The invention, in another form thereof, includes a load sensor which senses compressive and tensile loads and is affixed to a load bearing member of the running press, and a computational device for receiving the load value from the load sensor and computing a measure of the impulse energy created by both compressive and tensile forces experienced during one slide stroke of the running press.

The invention, in another form thereof, includes a load sensor which senses compressive and tensile loads and is affixed to a load bearing member of a running press, and a computational device for receiving the load value from the load sensor and computing a reference impulse energy value for one slide stroke of the mechanical press. The reference impulse energy value can be, for example, a reference value which corresponds to a slow speed operation of the running press, a reference value which corresponds to a normal production operation of the mechanical press, or a reference value which corresponds to a particular die set which is used with the mechanical press.

The invention, in another form thereof, comprises a load sensor which senses compressive and tensile loads and is affixed to a load bearing member of a running press, and a computational device for receiving the load value from the load sensor and storing a reference impulse energy value. The computational device computes the total impulse energy for one slide stroke of the running press, which includes the impulse energy created by both compressive and tensile forces. The computational device also computes a ratio of the total impulse energy for one slide stroke to the reference impulse energy value.

The invention, in another form thereof, comprises a load sensor for sensing compressive and tensile loads which is affixed to a load bearing member of the running press and a computational device which computes values of impulse energy for one slide stroke of the mechanical press. The computed value of impulse energy can be, for example, a measure of the impulse energy corresponding to the compressive load sensed by the load sensor, a measure of the impulse energy corresponding to the tensile load sensed by the load sensor, or a total measure of the impulse energy which includes both the impulse energy associated with the compressive load and the tensile load sensed by the load sensor.

The invention, in another form thereof, comprises a load sensor for sensing compressive and tensile loads which is affixed to a load bearing member of a running press and a computational device for computing impulse energy values for one slide stroke of the running press. The impulse energy values computed by the computational device may be, for example, the impulse energy corresponding to the compressive load sensed by the load sensor, the impulse energy corresponding to the tensile load sensed by the load sensor, or the total impulse energy corresponding to both the compressive load and tensile load sensed by the load sensor for one slide stroke. In this form, the computational device may also be utilized for computing reference impulse energy values, including reference impulse energy values corresponding to normal production operation, slow speed operation, or a particular die set used with the running press.

The computational device may further be used to compute a ratio of monitored impulse energy to a reference impulse energy value. The values computed in the computational device may be communicated to, for example, a digital storage device, a modem, a display device, an alert device or a shutoff device. The digital storage may be utilized for compiling histories of impulse energy values and their corresponding ratios to a reference impulse energy value. A modem may be used for communicating impulse energy values and/or their relation to a reference impulse energy value to a remote location. The display device may display monitored impulse energy and/or the ratio of the monitored impulse energy to a reference value so that service personnel may determine how features such as press speed, shut height and the die setup alter the operational condition of the running press. The alert device and the shutoff device will produce an alert signal and discontinue press operation, respectively, if the impulse energy value and/or the ratio of impulse energy value to a reference impulse energy value exceeds a predetermined measure.

The invention, in another form thereof, comprises a method of monitoring the reliability condition of a running press by monitoring the impulse energy of the running press and comparing the monitored impulse energy of the running press to a reference impulse energy value.

The invention, in another form thereof, comprises a method of monitoring the impulse energy of a running press. This method includes the steps of: placing a load sensor on a load bearing member of the running press, providing a computational device, communicating the load sensed by the load sensor to the computational device, plotting the sensed load value versus time and computing a value of impulse energy for one slide stroke of the running press using the sensed load value versus time curve.

The invention, in another form thereof, comprises a method of monitoring the reliability condition of a running press. This method includes the steps of: placing a load sensor on a load bearing member of the running press, providing a computational device, communicating the load sensed by the load sensor to the computational device, computing the absolute value of the sensed load values, plotting the absolute values of the sensed load values versus time and computing the area under the sensed load value versus time curve.

The invention, in another form thereof, comprises a method of monitoring the reliability condition of a running press. This method includes the steps of: monitoring the impulse energy of the running press. In this form, the step of monitoring the impulse energy of the running press includes: placing a load sensor on a load bearing member of the running press, providing a computational device, communicating the load sensed by the load sensor to the computational device, plotting sensed load values versus time, and computing a value of impulse energy for one slide stroke of the running press using the sensed load value versus time curve. In this form, the step of computing the value of impulse energy for one slide stroke of the running press comprises, for example, computing a value of tensile impulse energy, computing a value of compressive impulse energy or computing a total value of impulse energy for one slide stroke of the running press. The step of computing a value of tensile impulse energy includes: plotting the sensed tensile load versus time and computing the area under the sensed tensile load versus time curve. In this form, the step of computing a value of compressive impulse energy comprises: computing the absolute value of the sensed compressive load values, plotting the absolute values of the sensed compressive load values versus time, and computing the area under the sensed compressive load value versus time curve. The step of computing a total value of impulse energy for one slide stroke of the running press includes: computing the absolute value of the sensed load values, plotting the absolute values of the sensed load values versus time and computing the area under the sensed load value versus time curve.

The invention, in another form thereof, comprises a method of monitoring the reliability condition of a running press. This method includes the steps of: monitoring the impulse energy of the running press, determining a reference impulse energy value and computing a ratio of the monitored impulse energy for one slide stroke of the running press to the reference impulse energy for one slide stroke of the running press. The step of determining a reference impulse energy value includes: establishing a reference impulse energy value which corresponds, for example, to a slow speed operation of the running press, to a normal production operation of the running press, or to a particular die set used with the running press.

An advantage of the present invention is that monitoring of impulse energy provides a reliable indicator of mechanical press operating reliability.

Another advantage of the present invention is that multiple peaks in loads which occur during a pressing operation may be accounted for in determining the operating reliability of a mechanical press.

Another advantage of the present invention is that both compressive and tensile loads can be accounted for in determining the operating reliability of a mechanical press.

Another advantage of the present invention is that additional force severity activity which is due to multiple load peaks of either compressive or tensile loads can be accounted for in determining the operating reliability of a mechanical press.

A further advantage of the present invention is that impulse energy can be used to create a relative application severity reference signal which does not relate to actual peak load level.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 2:
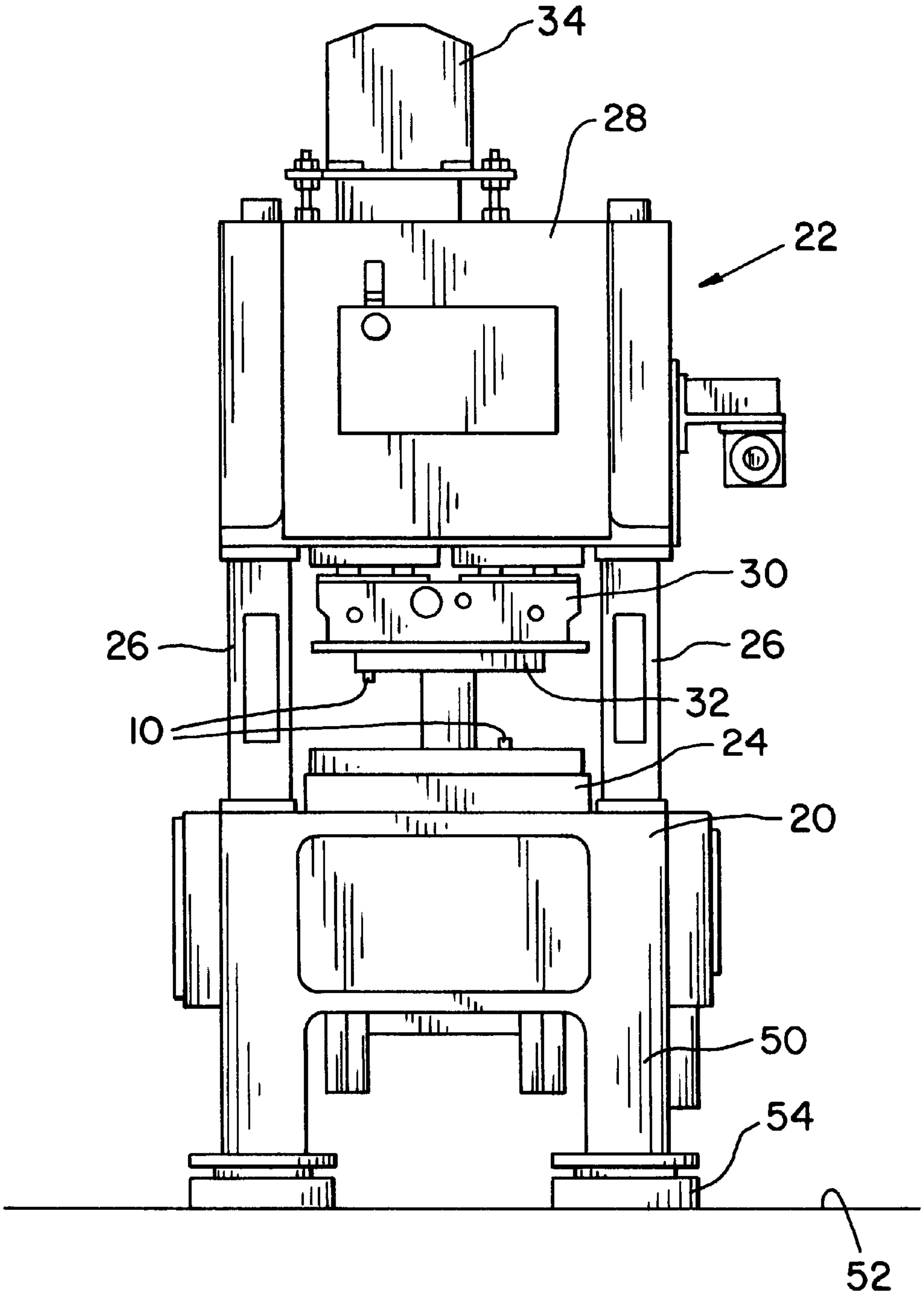
FIG. 2 is an elevational of a typical press which is the subject of impulse energy monitoring.

Referring now to the drawings and particularly to FIG. 2, there is depicted a typical press 22 having a bed 20 with a bolster 24. Attached vertically to the bed 20 are uprights 26 which support a crown 28. Above crown 28 and attached thereto is a press motor 34. A slide 30 is operatively connected so that during operation press motor 34 causes slide 30 to reciprocate in rectilinear fashion toward and away from the bed 20. Tooling 32 is operatively connected to slide 30. Leg members 50 are formed as an extension of bed 20 and are generally mounted to the shop floor 52 by means of shock absorbing pads 54.

Figure 1:
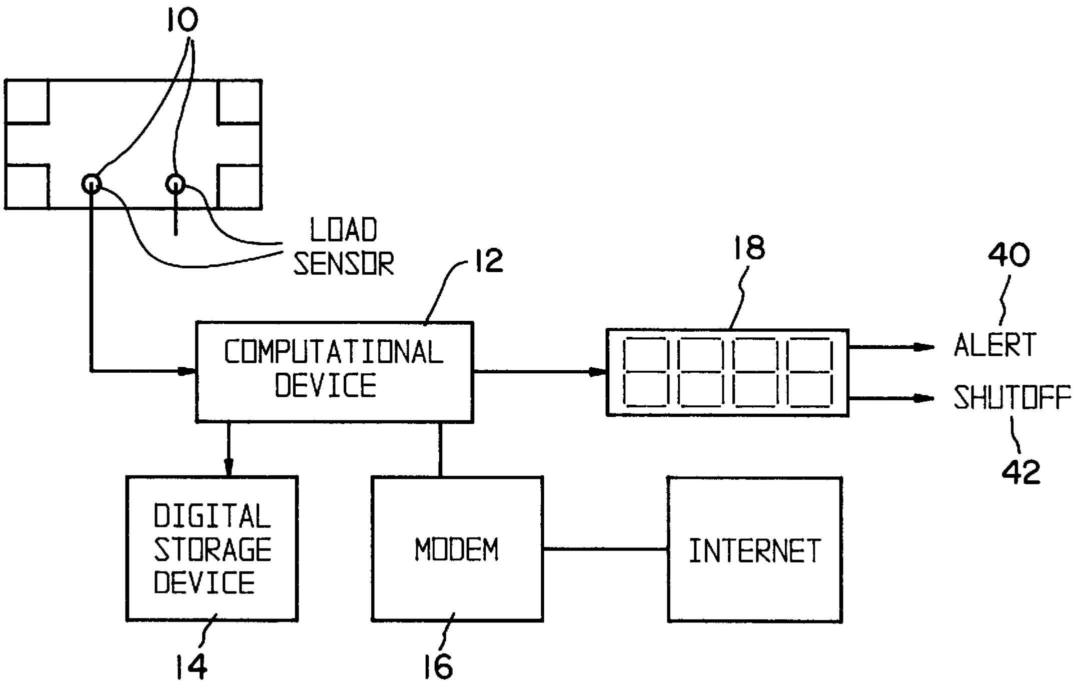
FIG. 1 is a schematic representation of an embodiment of the impulse energy monitoring apparatus.

FIG. 1 illustrates one embodiment of the invention wherein a computational device 12 receives sensed load values from load sensors 10. Computational device 12 is communicatively connected to digital storage device 14, modem 16, display 18, press alert signal 40 and press shutoff signal 42. Modem 16 may be connected to global computer networks, such as the internet, or another device may be substituted for modem 16, such as a NIC for direct connection to a computer network. Alternatively, other local or wide area network connection devices may be utilized. Data storage such as envisioned in data storage device 14 may be conducted either locally or remotely.

Figure 3A:
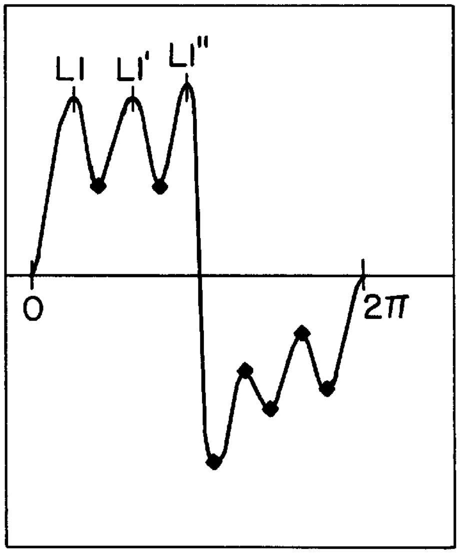
FIG. 3 is a graphical representation of load versus time measurements for different press applications.
Figure 3B:
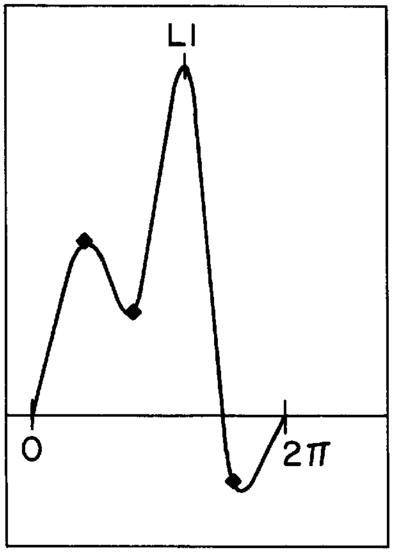
Figure 3C:
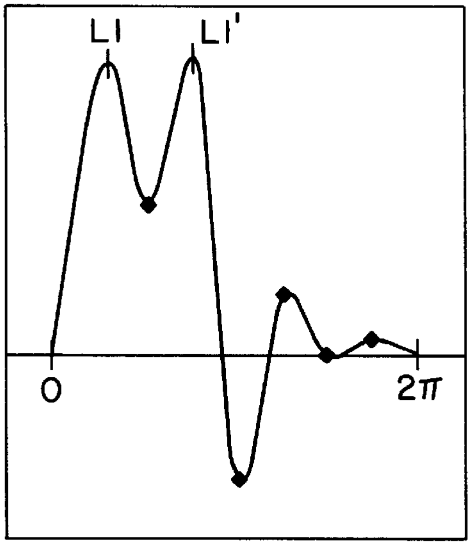
Figure 3D:
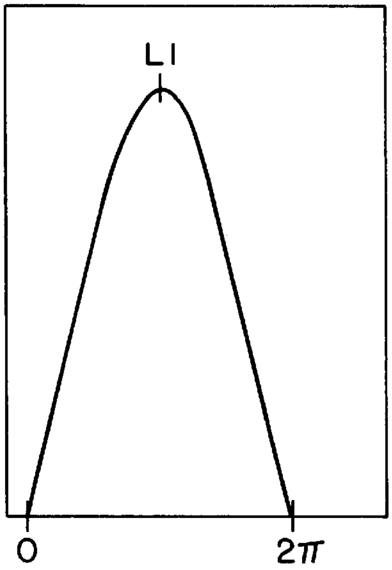

During press operation, load sensors 10 continually monitor and communicate load values to computational device 12. Computational device 12 receives load values from load sensors 10 and plots monitored load values versus time. FIG. 3 graphically depicts four load versus time curves for different press applications. As depicted in FIG. 3, different press applications may have the same peak compressive load (L1) and yet have very different impulse energy values. FIG. 3*a* depicts a press application in which the peak compressive load (L1) is experienced three times during a slide stroke L1, L1', L1". The press application depicted by FIG. 3*a* also displays significant, but not identical, tensile loads which are measured during a press slide stroke. FIGS. 3*a*–3*d* depict press applications which have very different impulse energy values and yet have the same peak load value (L1). Computational device 12 computes the area under the load versus time curve to determine the impulse energy for one slide stroke of the running press. Computational device 12 also computes and stores a reference impulse energy value. Computational device 12 transmits impulse energy information to digital storage device 14, modem 16, and/or display 18.

In one preferred embodiment, computational device 12 computes a reference impulse energy value which corresponds to a normal production operation of the running press. Computational device 12 then continually computes a ratio of measured impulse energy for one slide stroke of a mechanical press to the reference impulse energy which corresponds to a normal production operation of the running press. Device 12 could also compute a ratio to a set of force severity levels developed via correlation to empirical damage levels. This would create an equivalency to vibration severity levels, particularly creating a predetermined level based upon empirical data that showed a correspondence between force severity levels and a general level of damage that is going to occur. Computational device 12 may also communicate this ratio to digital storage device 14, modem 16, and display unit 18 as well as to a press alert signal 40 or a press shutoff signal 42.

During press operation, display 18 is visually checked by the operator or production manager to determine whether the impulse energy is acceptable. Alert signal 40 may be connected to a visual or audible alarm to warn the operator when the impulse energy has reached a predetermined level. Press shutoff signal 42 may be used to shut off press 22 when the impulse energy of the press 22 reaches a predetermined level.

The system may organize and compare compressive and tensile readings and warnings separately. The system may also compare the normal tensile and/or compressive inputs to that of a normal reference for a die when the die is being run or operated. Additionally, comparisons may be made by comparing the measurements to a general force severity level based on an empirical correlation of damage to a predetermined level of impact or impulse.

The system may also monitor variations in measured load or impulse from an initial setting or variation from the beginning the initial running of the system (e.g., measuring startup loads or impact versus mid-day, end-of-day, or other timed measurements). Such initial values for comparison may automatically or manually loaded in the system. The system may trip or sound an alarm when either an impulse limit and/or a peak load limit is exceeded or alternatively below a set minimum.

Digital storage device 14 stores historical data for the press being monitored so that press operating reliability may be accurately predicted. Additionally, modem 16 may communicate impulse energy values to a remote location.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for monitoring the reliability condition of a running press, the running press having load bearing members, said apparatus comprising:

a load sensor for sensing compressive and tensile loads, said load sensor affixed to a load bearing member of the running press; and a computational device operatively connected to said load sensor for computing a plurality of computed values, said device storing a plurality of data relating to the running press and receiving the load value from said load sensor, wherein one of said plurality of computed values is a measure of impulse energy for one slide stroke of the running press.

2. The apparatus as recited in claim 1, wherein said computational device comprises:

a microprocessor.

3. The apparatus as recited in claim 1, wherein said measure of impulse energy for one slide stroke of the running press is a total value of impulse energy for one slide stroke of the running press which includes the impulse energy created by both compressive and tensile forces experienced during one slide stroke.

4. The apparatus as recited in claim 1, wherein one of said plurality of computed values is a reference impulse energy value.

5. The apparatus as recited in claim 4, wherein one of said plurality of data is a reference impulse energy value.

6. The apparatus as recited in claim 5, wherein one of said plurality of computed values is a ratio of said total value of impulse energy for one slide stroke of the running press to said reference impulse energy value.

7. The apparatus as recited in claim 1, wherein one of said plurality of computed values is a measure of the impulse energy corresponding to the compressive load sensed by said load sensor for one slide stroke.

8. The apparatus as recited in claim 1, wherein one of said plurality of computed values is a measure of the impulse energy corresponding to the tensile load sensed by said load sensor for one slide stroke.

9. The apparatus as recited in claim 1, further comprising:

a digital storage device for storing at least one of said plurality of computed values, said digital storage device communicatively connected to said computational device.

10. The apparatus as recited in claim 1, further comprising:

a modem for communicating at least one of said plurality of computed values to a remote location, said modem communicatively connected to said computational device.

11. The apparatus as recited in claim 1, further comprising:

a display device for displaying at least one of said plurality of computed values, said display device communicatively connected to said computational device.

12. The apparatus as recited in claim 1, further comprising:

an alert device for producing an alert signal if at least one of said plurality of computed values exceeds a predetermined measure, said alert device communicatively connected to said computational device.

13. The apparatus as recited in claim 1, further comprising:

a shutoff device for discontinuing press operation if at least one of said plurality of computed values exceeds a predetermined measure, said shutoff device communicatively connected to said computational device.

14. A method of monitoring the reliability condition of a running press, the running press having press having load bearing members, said method comprising:

placing a load sensor on a load bearing member of the running press;

providing a computational device;

communicating the load sensed by the load sensor to the computational device;

plotting sensed load values versus time; and computing a value of impulse energy for one slide stroke of the running press using the sensed load value versus time curve.

15. The apparatus as recited in claim 6, wherein the ratio is compared to a range of force severity levels to determine potential damage to the running press.

16. The method of claim 14 wherein said step of computing a value of impulse energy for one slide stroke of the running press comprises:

computing a total value of impulse energy for one slide stroke of the running press which includes the impulse energy created by both the compressive and the tensile forces experienced during one slide stroke.

17. The method of claim 16, wherein said step of computing a total value of impulse energy for one slide stroke of the running press comprises:

computing the absolute value of the sensed load values;

plotting the absolute values of the sensed load values versus time; and computing the area under the sensed load value versus time curve.

18. The method of claim 14, wherein said step of computing a value of impulse energy of the press comprises:

computing a value of compressive impulse energy, said step of computing a value of compressive impulse energy comprising:

computing the absolute value of the sensed compressive load values;

plotting the absolute values of the sensed compressive load values versus time; and computing the area under the sensed compressive load value versus time curve.

19. The method of claim 14, wherein said step of computing a value of impulse energy of the press comprises:

computing a value of tensile impulse energy, said step of computing a value of tensile energy comprising:

plotting the sensed tensile load values versus time; and computing the area under the sensed tensile load value versus time curve.

20. The method of claim 16, further comprising:

determining a reference impulse energy value; and computing a ratio of the total value of impulse energy for one slide stroke of the running press to the reference impulse energy value for one slide stroke of the running press.

21. The method of claim 20, wherein said step of determining a reference impulse energy value comprises:

establishing a reference impulse energy value which corresponds to a slow speed operation of the running press.

22. The method of claim 20, wherein said step of determining a reference impulse energy value comprises:

establishing a reference impulse energy value which corresponds to a normal production operation of the running press.

23. The method of claim 20, wherein said step of determining a reference impulse energy value comprises:

establishing a reference impulse energy value which corresponds to a particular die set used with the running press.

24. The method of claim 20 comprising comparing the ratio to a range of force severity levels and determining potential damage to the running press.

* * * * *